(12) United States Patent
Patel (10) Patent No.: US 8,908,542 B2
(45) Date of Patent: Dec. 9, 2014

(54) VOICE QUALITY ANALYSIS DEVICE AND METHOD THEREOF

(75) Inventor: Prerak Patel, Glendale Heights, IL (US)

(73) Assignee: AT&T Mobility II LLC, Atlanta, GA (US)

(*) Notice: Subject to any disclaimer, the term of this patent is extended or adjusted under 35 U.S.C. 154(b) by 512 days.

(21) Appl. No.: 12/644,996

(22) Filed: Dec. 22, 2009

(65) Prior Publication Data

US 2011/0149754 A1    Jun. 23, 2011

(51) Int. Cl.
*H04J 1/16* (2006.01)
*H04L 29/06* (2006.01)
*H04M 3/22* (2006.01)

(52) U.S. Cl.
CPC ......... *H04L 65/1043* (2013.01); *H04M 3/2236* (2013.01); *H04L 65/80* (2013.01); *H04L 65/1023* (2013.01)
USPC ....................................... 370/252

(58) Field of Classification Search
CPC ......... H04L 47/10; H04L 47/30; H04L 47/11; H04L 47/15; H04L 47/35; H04L 43/50; H04L 43/0852; H04L 2012/64; H04L 12/64; H04L 65/102; H04L 12/185; H04L 45/16; H04L 29/0653; H04L 45/02; H04L 12/66; H04L 2012/46; H04L 2012/5618
USPC ......... 370/229, 230, 235, 252, 259, 390, 389, 370/352, 392, 400, 401; 379/32.01, 32.02, 379/32.03, 35, 85, 207.01, 211.01, 211.02, 379/221.15; 455/9, 67.12, 414.1, 417; 709/227, 230; 726/1, 21, 23
See application file for complete search history.

(56) References Cited

U.S. PATENT DOCUMENTS

| | | | |
|---|---|---|---|
| 6,870,905 B2* | 3/2005 | Pelaez et al. | 379/35 |
| 7,046,663 B1* | 5/2006 | Temoshenko et al. | 370/390 |
| 7,466,810 B1* | 12/2008 | Quon et al. | 379/201.01 |
| 7,616,586 B2 | 11/2009 | Li et al. | |
| 7,796,526 B2* | 9/2010 | Miller | 370/241 |
| 7,987,493 B1* | 7/2011 | Reams et al. | 726/1 |
| 2003/0097447 A1* | 5/2003 | Johnston | 709/227 |
| 2004/0236547 A1* | 11/2004 | Rappaport et al. | 703/2 |
| 2006/0018255 A1* | 1/2006 | Tankhiwale | 370/229 |
| 2006/0059163 A1* | 3/2006 | Frattura et al. | 707/10 |
| 2006/0143300 A1* | 6/2006 | See et al. | 709/227 |
| 2006/0153174 A1* | 7/2006 | Towns-von Stauber et al. | 370/356 |
| 2006/0200845 A1 | 9/2006 | Foster et al. | |
| 2006/0268686 A1* | 11/2006 | Shei et al. | 370/217 |
| 2007/0030808 A1* | 2/2007 | Croak et al. | 370/237 |
| 2007/0110053 A1* | 5/2007 | Soni et al. | 370/389 |
| 2007/0183403 A1* | 8/2007 | Somers | 370/352 |
| 2007/0242655 A1* | 10/2007 | Li et al. | 370/352 |
| 2007/0249387 A1* | 10/2007 | Doradla et al. | 455/552.1 |
| 2008/0137585 A1* | 6/2008 | Loyola et al. | 370/315 |
| 2008/0220754 A1* | 9/2008 | Erol et al. | 455/417 |
| 2008/0276294 A1* | 11/2008 | Brady | 726/1 |
| 2008/0300871 A1* | 12/2008 | Gilbert | 704/233 |
| 2009/0013210 A1* | 1/2009 | McIntosh et al. | 714/4 |
| 2009/0141883 A1* | 6/2009 | Bastien | 379/213.01 |

(Continued)

*Primary Examiner* — Abdullah Riyami
(74) *Attorney, Agent, or Firm* — Akerman LLP; Michael K. Dixon; Mammen P. Zachariah (57) ABSTRACT

A portion of a voice call is forked by copying packets associated with voice call at a device providing an interface between two networks. The packets to be copied are identified based on address and port information associated with the voice call. The portion of the voice call is analyzed to determine the source of any voice quality issues associated with the call.

14 Claims, 6 Drawing Sheets

(56) References Cited

U.S. PATENT DOCUMENTS

| | | |
|---|---|---|
| 2009/0185558 A1* | 7/2009 | Yeom .......................... 370/352 |
| 2009/0191873 A1* | 7/2009 | Siegel et al. ............... 455/435.2 |
| 2009/0192791 A1* | 7/2009 | El-Maleh et al. ............. 704/219 |
| 2010/0054158 A1* | 3/2010 | Mathai et al. ................. 370/259 |
| 2010/0057932 A1* | 3/2010 | Pope et al. ................... 709/236 |
| 2010/0091665 A1* | 4/2010 | Yokoyama ................... 370/249 |
| 2010/0220714 A1* | 9/2010 | Clark et al. .................. 370/352 |
| 2010/0269044 A1* | 10/2010 | Ivanyi et al. ................. 715/736 |
| 2011/0116492 A1* | 5/2011 | Byron et al. ................. 370/352 |
| 2011/0143748 A1* | 6/2011 | Shah et al. ................... 455/424 |
| 2011/0200034 A1* | 8/2011 | Delveaux et al. ............ 370/352 |
| 2011/0264758 A1* | 10/2011 | Pope et al. ................... 709/212 |
| 2013/0159705 A1* | 6/2013 | Leedom, Jr. .................. 713/156 |

* cited by examiner

VOICE QUALITY ANALYSIS DEVICE AND METHOD THEREOF

FIELD OF THE DISCLOSURE

The present disclosure generally relates to communications networks, and more particularly relates to monitoring voice quality on communications networks.

BACKGROUND

Communications networks are used to provide a variety of services to users. One such service is a voice calling service, where the user of a telephone device is able to speak to another user of a telephone device via the communications network. In some circumstances, the voice data can be digitized and communicated over a packet-switched network, such as a local area network, wide area network, or the Internet. However, problems in the network can therefore impact the quality of transmission of voice data. For example, problems such as echo, one-way audio or distorted audio can reduce the quality of voice data transmission.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
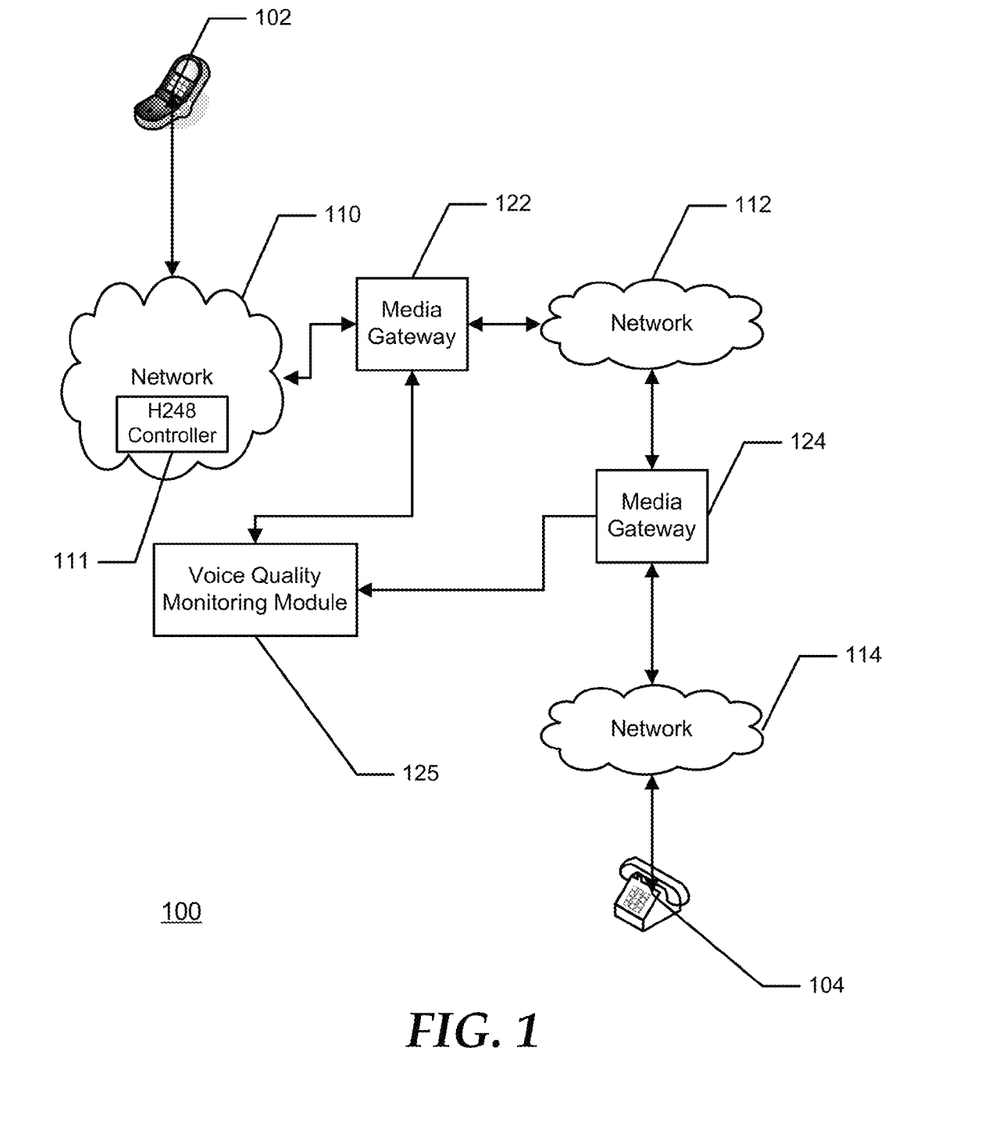
FIG. 1 is a block diagram illustrating a communications network in accordance with one embodiment of the present disclosure.

FIG. 1 shows a block diagram of a communication network 100 including a telephone device 102, a telephone device 104, networks 110, 112, and 114, Media Gateway devices 122 and 124 and a voice quality monitoring tool, illustrated as voice quality analysis module 125. The networks 110, 112, and 114 are each configured to route data to a destination according to a network protocol associated with the network. In an embodiment, the networks 110, 112, and 114 are associated with different network protocols. For example, in the illustrated embodiment, it is assumed that the network 110 and network 114 are each public switched telephone networks (PSTNs) configured to transmit an analog or digital signal to a destination based on a telephone number or other identifier associated with the analog signal. The networks 110 and network 114 can also be wireless networks, or combinations of wireless and PSTN networks. The identifier is referred to herein as the target identifier. The PSTN networks 110 and 114 each include a set of switches that can be configured, based on the target identifier to provide a dedicated connection between a device originating a communication session and a destination device. The network 112 is assumed to be a packet-switched network, such as the Internet, configured to route individual packets to a destination based on address and port information associated with each packet. Accordingly, the network 112 does not create a dedicated connection between a source and destination of each packet, so that different packets associated with the same address and port information can be routed to the destination via multiple paths.

The Media Gateway devices 122 and 124 are each configured to provide an interface between the networks 110 and 114, respectively, and the network 112. In particular, Media Gateway devices 122 and 124 are each configured to receive digital signals from PSTN networks 110 and 114, respectively, and translate those signals to packets for transmission via network 112. In addition, Media Gateway devices 122 and 124 are configured to receive packets from network 112 and translate received packets to one or more digital signals for transmission via networks 110 and 114, respectively.

The telephone devices 102 and 104 are each configured to connect to networks 110 and 114, respectively, in response to user entry of a target identifier, such as a telephone number. The telephone devices 102 and 104 are further configured to provide an audio interface for entry and reception of voice data. Telephone devices 102 and 104 thus provide an interface for users to conduct voice communication sessions via the communication network 100. A voice communication session is referred to herein as a "voice call." It will be appreciated that a voice communication session can also involve communication of other data in addition to voice data. For example, a voice communication session can also include communication of visual information, such as picture information, documents, caller identification information, or the like. Accordingly, telephone devices 102 and 104 can be any device that provides for connection to the networks 110 and 114, respectively, including telephones, cellular or mobile phones, personal data assistants, computer devices, or the like.

Establishment and communication of a voice call with the communication network 100 can be understood with reference to an example, where the user of telephone device 102 dials a telephone number associated with telephone device 104. In response, the switches of network 110 are configured to provide a dedicated connection between telephone device 102 and Media Gateway device 122. Further, Media Gateway device 122 provides H248 context identification information to H248 controller 111. The H248 context identification information identifies unique combination of IP address and a port to be used as a source and a destination while communicating with network 112. Network 110 further provides a dedicated connection between telephone device 102 and Media Gateway device 124 provides another H248 context identification to H248 controller 111 to be used for communication between Media Gateway device 124 and network 112. The H248 controller 111 uses both of these context identifications to setup a bearer path between Media Gateway devices 122 and 124 via network 112. Network 110 further provides an indication of the telephone number to Media Gateway device 122. In response, Media Gateway device 122 further determines that the target of the voice call is telephone device 104, and determines that telephone device 104 is configured to be connected to network 112 via Media Gateway device 124. Accordingly, Media Gateway device 122 creates one or more packets indicating a voice call has been requested by telephone device 102, addresses each of those packets to Media Gateway device 124 and communicates the packets via network 112. In response to receiving the packets, Media Gateway device 124 provides an indication to network 114 that a voice call request has been targeted to telephone device 104. In response, the switches of network 114 are configured to create a dedicated connection between Media Gateway device 124 and telephone device 104.

During the voice call, the telephone devices 102 and 104 communicate voice information to the networks 110 and 114 respectively, where it is digitized and communicated to the Media Gateway devices 122 and 124 via digital signals. The Media Gateway devices translate the received digital signals to packets having an address and port number associated with the other Media Gateway device, and communicate the packets via network 112. In response to receiving packets, the Media Gateway devices 122 and 124 translate the packets to digital signals for transmission to the telephone devices 102 and 104 via their respective networks. The communication network 100 thus provides an infrastructure for communication of voice calls via wireless, PSTN and packet-switched networks.

Voice quality analysis module 125 is configured to monitor the voice quality for voice calls communicated via communication network 100. In particular, problems in one or more of the networks 110, 112, and 114 can result in data transmission issues, such as crosstalk, echo, static, one-way audio, or other issues that impact the quality of voice data rendered at the telephone devices 102 and 104. Voice quality analysis module 125 is configured to assist in identification and correction of voice quality issues by identifying the network that is likely causing the issue.

In particular, the H248 controller 111 uses two unique context ids and therefore two combination of IP address and port to carry voice packets over network 112. Voice quality analysis module 125 is configured to duplicate all packets with source or destination as one of the IP address and port combination and communicate the copied portions to the voice quality analysis module 125. Copying of at least a portion of a voice call is referred to herein as forking the voice call. To illustrate, Media Gateway devices 122 and 124 provide periodic updates to the voice quality analysis module 125 to indicate the voice calls that each device is communicating via network 112, and the address and port information associated with each voice call. To fork a call, the voice quality analysis module 125 provides instructions to at least one of the Media Gateway devices 122 and 124 indicating address and port information associated with a call to be forked. In an embodiment, the instructions provided comply with the H.248 protocol for control of Media Gateway devices. In response to receiving the instructions, the respective Media Gateway device copies one or more packets associated with the indicated address and representative of a portion of the voice data associated with the voice call, and communicates the packets to voice quality analysis module 125. The voice quality analysis module 125 reconstructs the portion of the voice data based on the copied packets, and analyzes the reconstructed portion to identify any a voice quality characteristic of the copied portion. The voice quality characteristic can be a signal-to noise-ratio, percentage of lost information, or other characteristic indicative of voice quality.

Further, voice quality analysis module 125 collects the portion of the voice data based on the copied packets. An engineer or a technician can then reconstruct the collected voice packets into an audible format using software tools. The technician or engineer can then listen to the voice conversation to validate the quality at the collection point. By forking calls at different points in the network, the technician engineer can isolate the source of the voice quality issue to a specific segment or device of the network. In another embodiment, in response to identifying a network issue causing a voice quality problem, the voice quality analysis module 125 can instruct one of the Media Gateway devices 122 and 124, or other portion of the communication network 100 to take remedial action to address the identified issue. For example, if the voice quality analysis module 125 determines the voice quality issue is resulting from crosstalk in network 114, it can instruct network 114 to reconfigure it switches to create a different dedicated connection between Media Gateway device 124 and telephone device 104.

It will be appreciated that although voice quality analysis module 125 is illustrated as being remotely located from the Media Gateway devices 122 and 124, in other embodiments the voice quality analysis module 125 can be co-located at one or more of the Media Gateway devices. In another embodiment, the voice quality analysis module 125 can communicate with the Media Gateway devices 122 and 124 via the network 112 or another network. In still another embodiment, different voice quality analysis modules can be located at each Media Gateway device.

Figure 2:
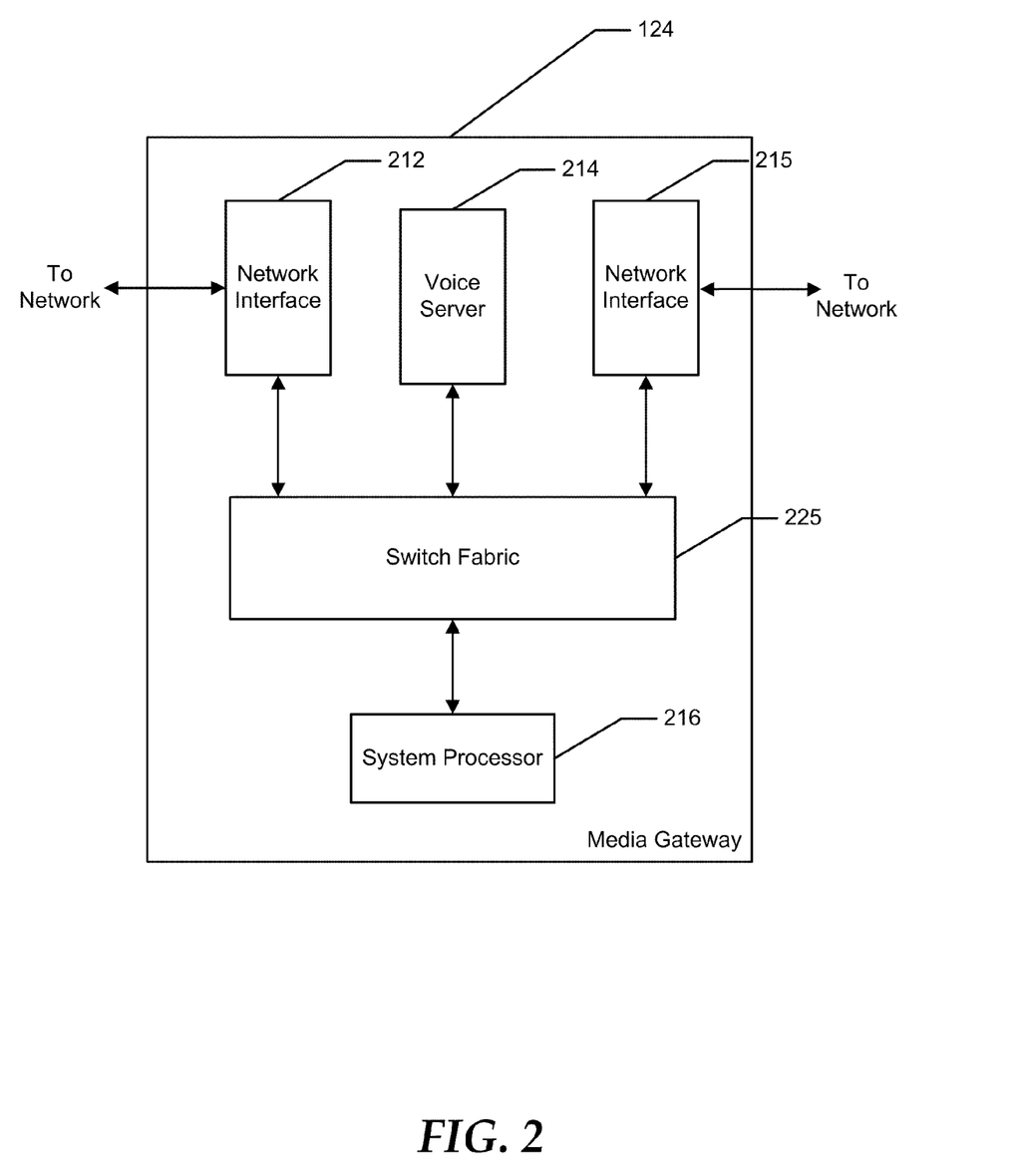
FIG. 2 is a block diagram of a Media Gateway device in accordance with one embodiment of the present disclosure.

FIG. 2 illustrates a block diagram of the Media Gateway device 124 in accordance with one embodiment of the present disclosure. Media Gateway device 124 includes a network interface 212, a network interface 215, a voice server 214, and a system processor 216, each connected to switch fabric 225. The switch fabric 225 provides a switching backbone to route packets between each of the modules connected to the fabric. The system processor 216 is a processor device configured to control operations of the Media Gateway device 124, including operation of the switch fabric 225. The voice server 214 is a processor device operable to execute instructions to perform tasks indicated by the instructions. The voice server 214, the system processor 216, and the interfaces 212 and 215 can each perform one or more voice quality operations, including one or more operations of the voice analysis module 125. In other embodiments, one or more of these voice quality operations can be performed remotely. The network interface 212 and 215 are each connected to a network and are operable to provide a physical and logic layer interface to communicate packets to their respective networks. Accordingly, network interfaces 212 and 215 can each be an Ethernet module, a time-division multiplexed (TDM) module, an asynchronous transfer mode (ATM) module, or the like, depending on the kind of network to be connected to the network interface.

In operation, the network interface 215 is configured to receive a digital signal from the network 114 and route the signal to the system processor 216 via the switch fabric 225. The system processor 216 determines a destination associated with the digital signal, determines an address and port number associated with the destination based on the H248 context information associated with the signal, and translates the digital signal to one or more packets including the address and port number. Further, network interface 212 is configured to receive packets from the network 112 and route the packets to the system processor 216 via the switch fabric 225. The system processor 216 determine a destination for each packet based on the corresponding address and port number for each packet, and communicates each packet to the dedicated connection of the network 114 associated with the destination by routing the packet to network interface 215.

System processor 216 is configured to fork calls received at the Media Gateway device 124. Accordingly, System processor 216 monitors activity at switch fabric 225 to determine whether address and port number information associated with each packet routed over the fabric matches a voice call that has been selected for forking. System processor 216 copies each packet associated with a voice call that has been identified for forking and stores the copied packets for reconstruction of the voice call and subsequent voice quality analysis.

Figure 3:
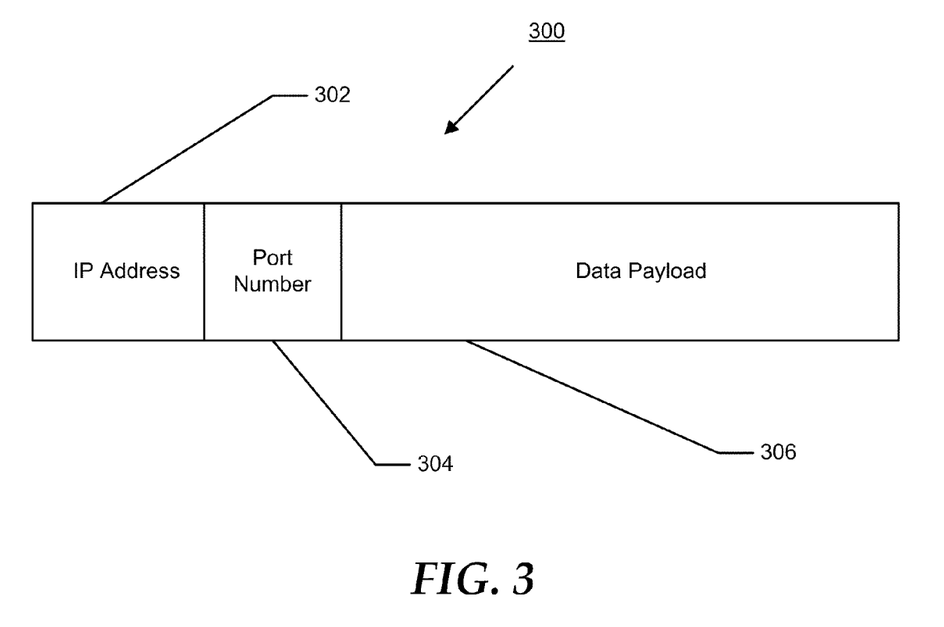
FIG. 3 is a block diagram of a data packet in accordance with one embodiment of the present disclosure.

FIG. 3 illustrates a packet 300 created or received at network interface 215 in accordance with one embodiment of the present disclosure. Packet 300 includes an address portion 302, a port number portion 304, and a data payload 306. The address portion 302 includes address information indicative of a destination of packet 300. In the illustrated embodiment, the address information is an Internet Protocol (IP) address. The port number portion 304 includes port information associated with the destination of the packet 300. The data payload 306 includes information representative of voice data associated with a voice call.

In an embodiment, the address portion 302 indicates a Media Gateway device to which the packet 300 is to be routed. The port number portion 304 indicates a dedicated connection of a PSTN network with which the packet 300 is associated. Accordingly, upon receiving the packet 300, the Media Gateway device 300 can translate the packet to a digital signal and communicate the signal to the dedicated connection of the PSTN network indicated by the port number portion 304.

Figure 4:
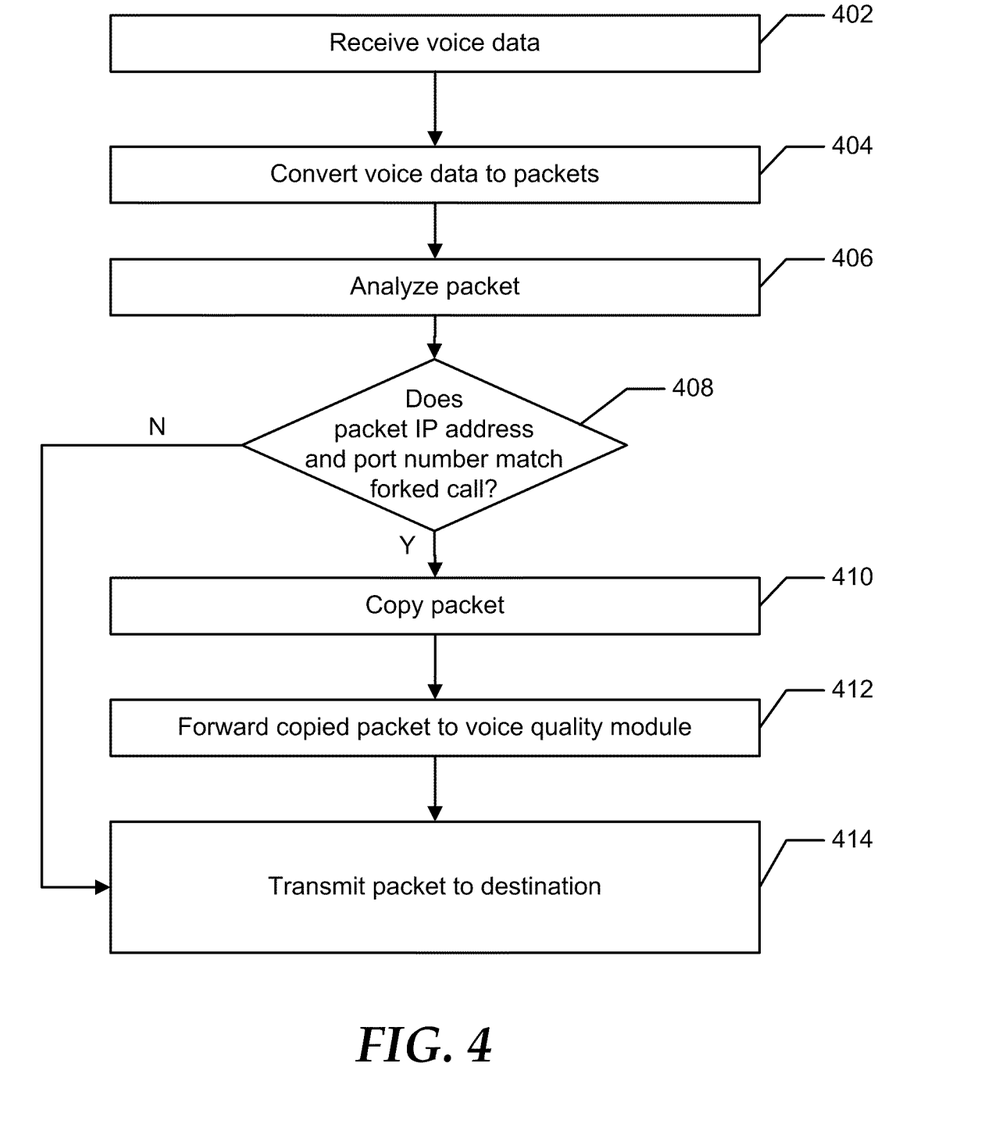
FIG. 4 is a flow diagram of a method of forking a voice call in accordance with one embodiment of the present disclosure.

FIG. 4 shows a block diagram of a method of forking a voice call in accordance with one embodiment of the present disclosure. At block 402, a Media Gateway device receives a signal representative of voice data from a network. In an embodiment, the network that provides the signal is a public switched telephone network, and the voice data is associated with a voice call. At block 404, the Media Gateway device converts the signal into a set of data packets representing the voice data. Each packet includes an Internet Protocol address indicative of the destination of the packets and a port number indicative of a communication port at the destination associated with the voice call.

At block 406, the Media Gateway device analyzes a first packet of the set of packets to determine the IP address and port number associated with the packet. At block 408, the Media Gateway device compares the IP address and port number of the packet to an IP address and port number that have been identified for call forking. If the IP address and port number do not match the call forking IP address and port number, the method flow moves to block 414 and the Media Gateway device transmits the packet to its destination without copying the packet for voice quality analysis.

Returning to block 408, if the IP address and port number match the call forking IP address and port number, the method flow moves to block 410 and the Media Gateway device makes a copy of the packet. At block 412, the copy is transmitted to a voice quality analysis module for analysis. At block 414 the packet that was copied is transmitted by the Media Gateway device to its destination. It will be appreciated that the Media Gateway device analyses each packet formed or received at the device, and copies each packet having the forking IP address and port number to the voice quality analysis module for analysis. The Media Gateway device thus forks the voice call associated with the matched IP address and port number.

Figure 5:
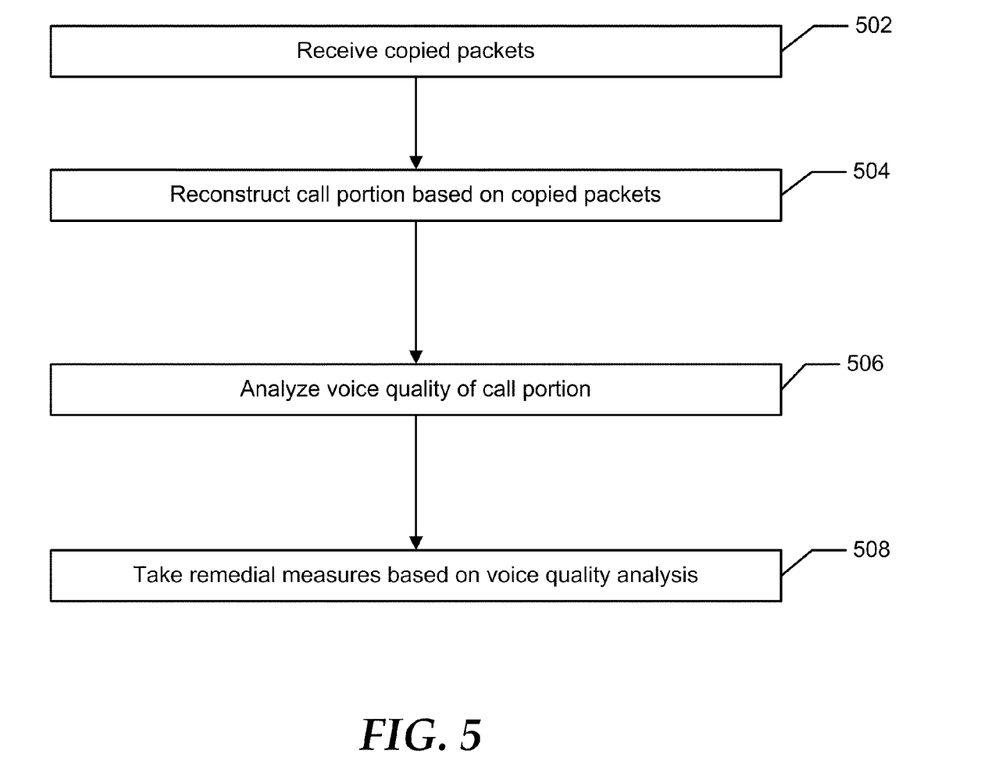
FIG. 5 is a flow diagram of a method of monitoring voice quality of a voice call in accordance with one embodiment of the present disclosure.

FIG. 5 illustrates a flow diagram of a method of analyzing the voice quality of a voice call in accordance with one embodiment of the present disclosure. At block 502, a voice quality analysis module receives packets copied from a forked voice call. At block 504, the voice quality analysis module reconstructs a portion of a voice call associated with the received packets. The portion of the voice call can be reconstructed by extracting the data payload of each packet, compiling the extracted payloads into a digital signal, and converting the digital signal to an analog signal similar to those used by telephone devices to render audio information. At block 506, the voice quality analysis module analyzes the reconstructed portion of the voice call to identify any voice quality issues. At block 508, the voice quality analysis module takes remedial action based on any identified issues. Remedial action can include rerouting or otherwise changing connections at a PSTN network, rerouting packets in a packet-switched network, change quality-of-service policies, or the like.

Figure 6:
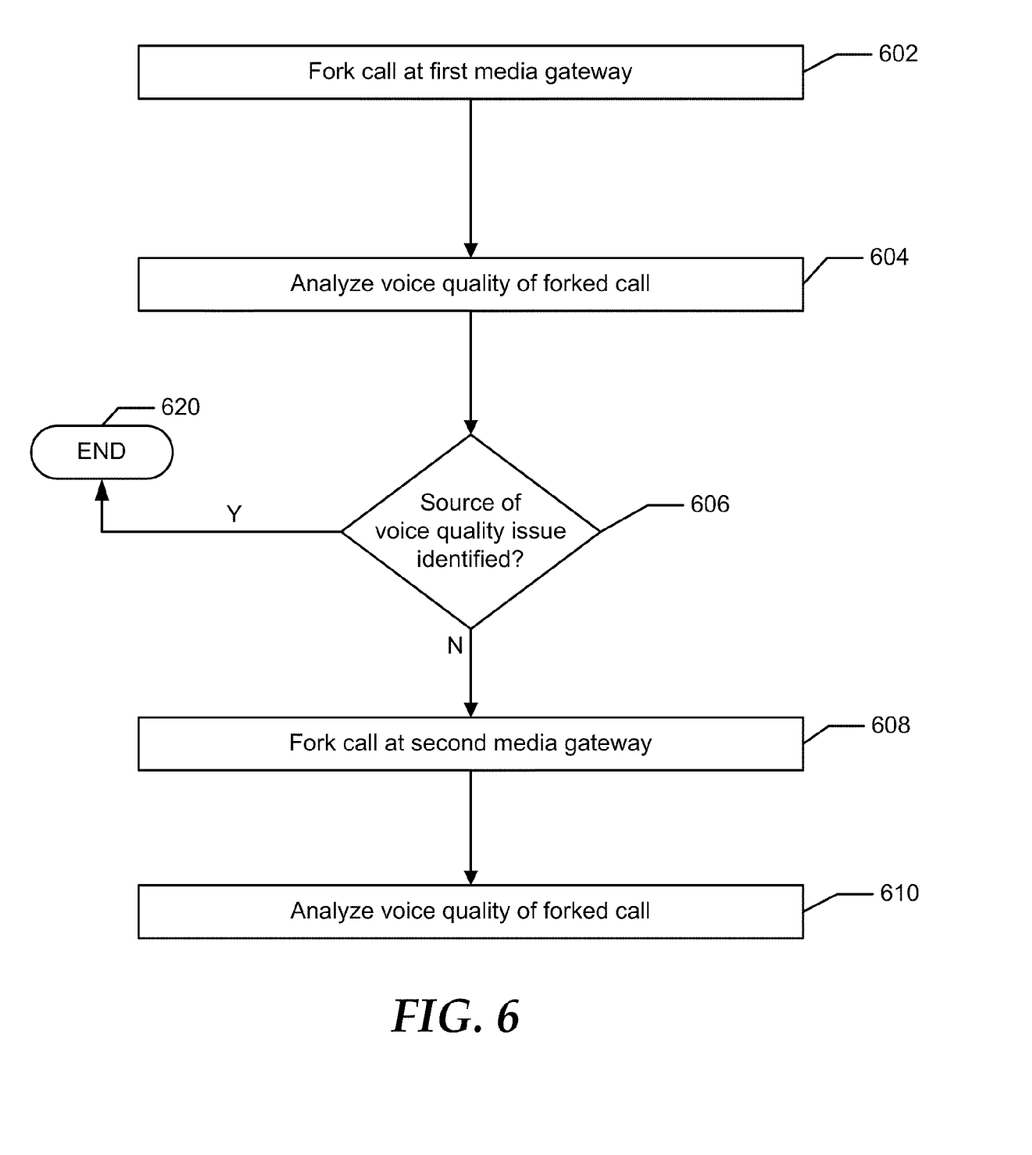
FIG. 6. is a flow diagram of a method of monitoring voice quality of a voice call in accordance with another embodiment of the present disclosure.

FIG. 6 shows a flow diagram of a method of monitoring voice quality of a voice call in accordance with another embodiment of the present disclosure. At block 602, a voice call is forked at a first Media Gateway device by copying packets associated with the voice call at the device. At block 604, a voice quality analysis module analyzes the quality of the forked call to determine the source of a voice quality issue. At block 606 the voice quality analysis module determines if the source of the voice quality issue has been identified. If so, the source is communicated to service personnel or to other computer devices so that remedial action can be taken. Accordingly, the method ends at block 620. If the voice quality analysis module does not determine the source of the voice quality issue at block 606, the method flow moves to block 608 and the voice quality analysis module causes the call to be forked at a second Media Gateway device. At block 610, the voice quality analysis module analyzes the voice quality of the call based on the call forked at the second Media Gateway device to determine the source of the voice quality issue. Accordingly, the voice quality analysis module can serially or simultaneously fork the call at different Media Gateway devices until the network causing the voice quality issue is identified.

This can be better understood with reference to an example. Referring again to FIG. 1, assume that a problem at network 112 is causing a voice quality issue with a call between telephone devices 102 and 104. A user of telephone device 102 notifies the service provider of the issue. In response, the call is forked at the Media Gateway device 122. Because the network 110 is not causing the voice quality issue, voice quality analysis module 125 does not identify a voice quality problem based on the forked call. In response, the call is forked at Media Gateway device 124, and determines that this forked call has a voice quality issue. Accordingly, based on the fact that the forked call from Media Gateway device 122 did not indicate a voice quality problem and the forked call from Media Gateway device 124 did indicate a problem, the voice quality analysis module 125 determines the source of the voice quality problem is network 112. In response, voice quality analysis module 125 takes remedial action, such as notification of service personnel, to correct the issue at network 112.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method, comprising:
   receiving a first packet at a processing device, wherein the first packet is associated with a voice call;
   copying, in response to determining that a first address associated with the first packet matches a second address identified for call forking, a payload of the first packet to a second packet at the processing device;
   communicating the first packet from the processing device to a target associated with the first address;
   determining a voice quality characteristic of the voice call based on the second packet;
   determining an identity of a network responsible for the voice quality characteristic;
   instructing the network responsible for the voice quality characteristic to reconfigure a switch in the network to create a different connection between a media gateway and the target so as to prevent crosstalk; and
   taking a remedial measure based on the voice quality characteristic and based on the identity of the network, wherein the remedial measure is selected from the group consisting of rerouting a third packet associated with the voice call, changing a quality of service policy associated with the voice call, and changing a connection at a first public switched telephone network.

2. The method of claim 1, wherein determining the voice quality characteristic comprises:
   constructing a copy of a portion of the voice call based on the second packet; and
   determining the voice quality characteristic of the copy of the voice call.

3. The method of claim 1, wherein receiving the first packet comprises receiving the first packet from a first network associated with a first communication protocol and wherein communicating the first packet from the processing device comprises communicating the first packet via a second network associated with a second communication protocol.

4. The method of claim 3, wherein the first network is the public switched telephone network.

5. The method of claim 4, wherein the second network is a packet-switched network.

6. The method of claim 1, wherein the processing device comprises the media gateway device that provides an interface between two networks.

7. The method of claim 1, wherein copying the first packet comprises copying the first packet in response to determining a first port number associated with the first packet matches a second port number.

8. The method of claim 1, wherein the voice quality characteristic is selected from the group consisting of a signal-to-noise ratio and a percentage of lost information.

9. A device, comprising:
   a processor that executes instructions to perform operations, the operations comprising:
   receiving a first packet;
   communicating the first packet to a target associated with a first address, the first packet associated with a voice call;
   copying, in response to determining that the first address matches a second address identified for call forking, the first packet to a second packet; and
   forwarding the second packet for analysis of voice quality of the voice call, wherein a remedial measure is taken based on the analysis of voice quality and based on an identification of a network responsible for a problem detected in the voice quality of the voice call, wherein the remedial measure is selected from the group consisting of rerouting a third packet associated with the voice call, changing a quality of service policy associated with the voice call, and changing a connection at a public switched telephone network, and wherein an instruction is sent to the network responsible for the problem to reconfigure a switch in the network to create a different connection between a media gateway and the target so as to prevent crosstalk.

10. The device of claim 9, wherein the operations further comprise constructing a copy of a portion of the voice call based on the second packet and a third packet.

11. The device of claim 9, wherein the operations further comprise receiving the first packet from a first network associated with a first communication protocol and communicating the first packet to the target via a second network associated with a second communication protocol.

12. The device of claim 11, wherein the first network is the public switched telephone network.

13. The device of claim 12, wherein the second network is a packet-switched network.

14. The device of claim 9, wherein the analysis of voice quality is selected from the group consisting of a signal-to-noise ratio and a percentage of lost information.

* * * * *